United States Patent [19] [11] 3,946,825
Gail [45] Mar. 30, 1976

[54] AUTOMATIC STEERING SYSTEM FOR STANDING-CROP HARVESTER

[75] Inventor: Josef Gail, Unterwittelsbach near Aichach, Germany

[73] Assignee: Maschinenfabrik Fahr AG, Gottmadingen, Germany

[22] Filed: Aug. 12, 1974

[21] Appl. No.: 496,743

[30] Foreign Application Priority Data
Aug. 14, 1973 Germany............................ 2340983

[52] U.S. Cl.......... 180/79.2 R; 56/10.2; 56/DIG. 15
[51] Int. Cl.².......................................... B62D 5/06
[58] Field of Search......... 180/79.2 R, 79.2 D, 79.1, 180/79, 98; 56/10.2, DIG. 15; 172/4.5; 94/84

[56] References Cited
UNITED STATES PATENTS

| | | | |
|---|---|---|---|
| 2,074,251 | 3/1937 | Braun .................................. | 180/79.1 |
| 2,424,288 | 7/1947 | Severy............................. | 180/79.2 R |
| 2,847,077 | 8/1958 | Vaughan............................ | 180/79.1 |
| 2,990,902 | 7/1961 | Cataldo........................... | 180/79.1 X |
| 3,132,710 | 5/1964 | Petrella et al...................... | 180/79.1 |
| 3,674,094 | 7/1972 | Kuntz................................. | 404/84 X |
| 3,765,501 | 10/1973 | Burvee........................... | 180/79.2 R |

*Primary Examiner*—M. H. Wood, Jr.
*Assistant Examiner*—John A. Pekar
*Attorney, Agent, or Firm*—Karl F. Ross; Herbert Dubno

[57] ABSTRACT

A standing-crop harvester has a chassis adapted to be displaced along the ground in a transport direction and carrying a pair of guide wheels which are normally controlled from a steering wheel. A sensor carried on an arm in front of the machine detects the edge of a swath in a standing crop and generates an output which varies the impedance of one element of a bridge circuit. Another element of this bridge circuit has its impedance varied in accordance with inclination of the harvester on the ground, another element is varied in accordance with the speed of the harvester on the ground, and a fourth element is varied in accordance with the position of the wheels of the harvester relative to the direction of travel. A zerovoltage detector connected across this bridge operates an electromechanical valve which steers the vehicle automatically, compensating for inclination of the ground under the harvester and speed of the harvester along the ground, and using the feedback signal from the wheel positions so as to accurately guide the harvester along the edge of the swath. The steering wheel is provided with an electrical capacitative sensor which shuts off the automatic steering system immediately when the operator touches the wheel so that he can readily take over manual operation of the machine. In addition a double check valve is provided between the power steering system and the hydraulic cylinder serving to steer the wheel so as to prevent rotation of the steering wheel when the automatic pilot is in operation.

9 Claims, 9 Drawing Figures

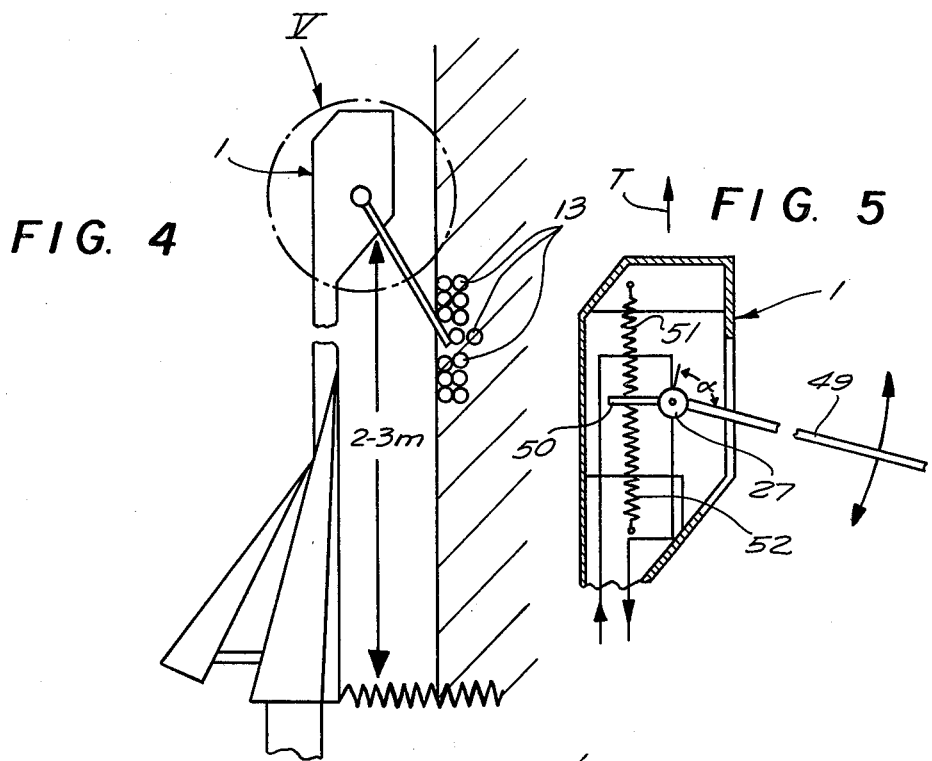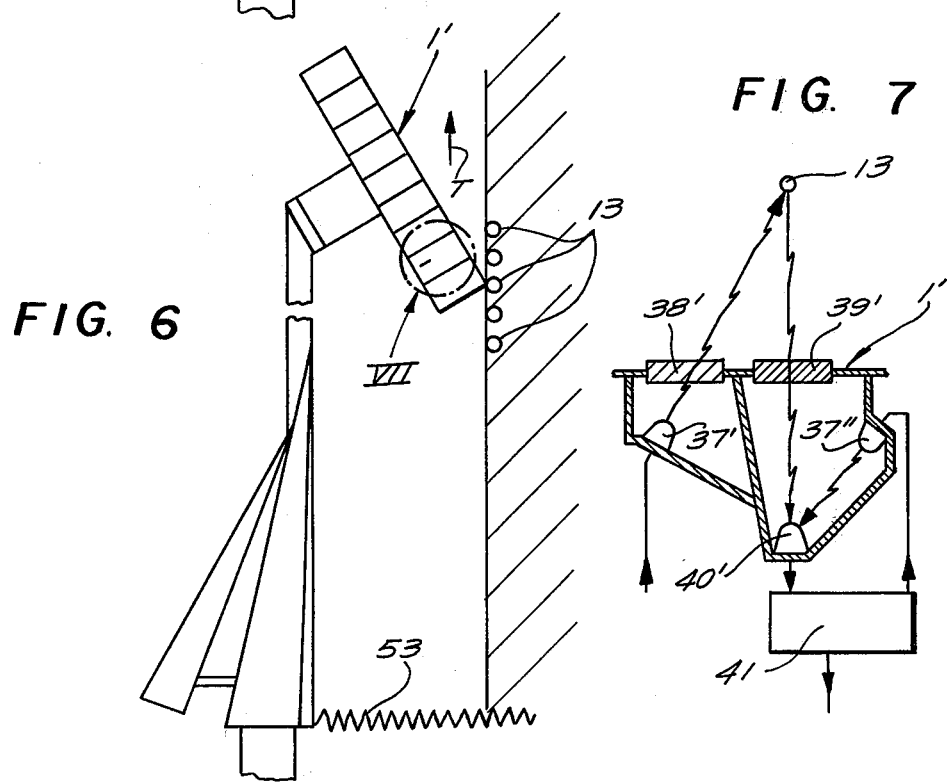

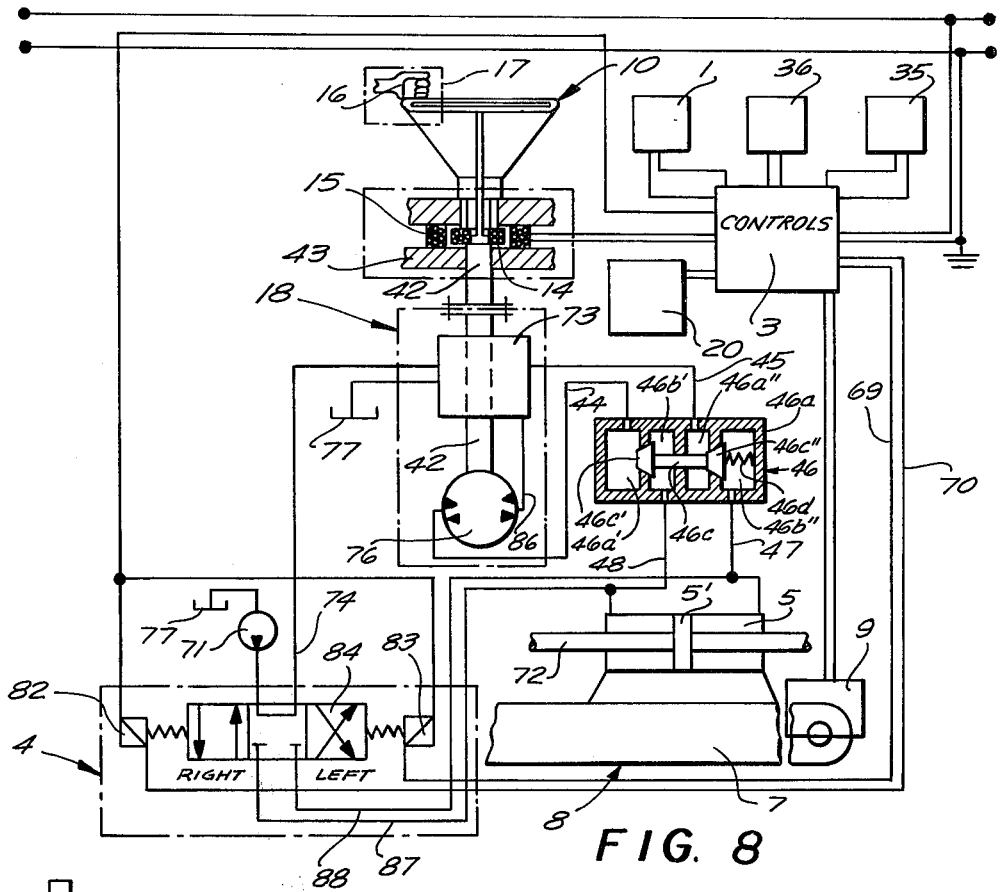
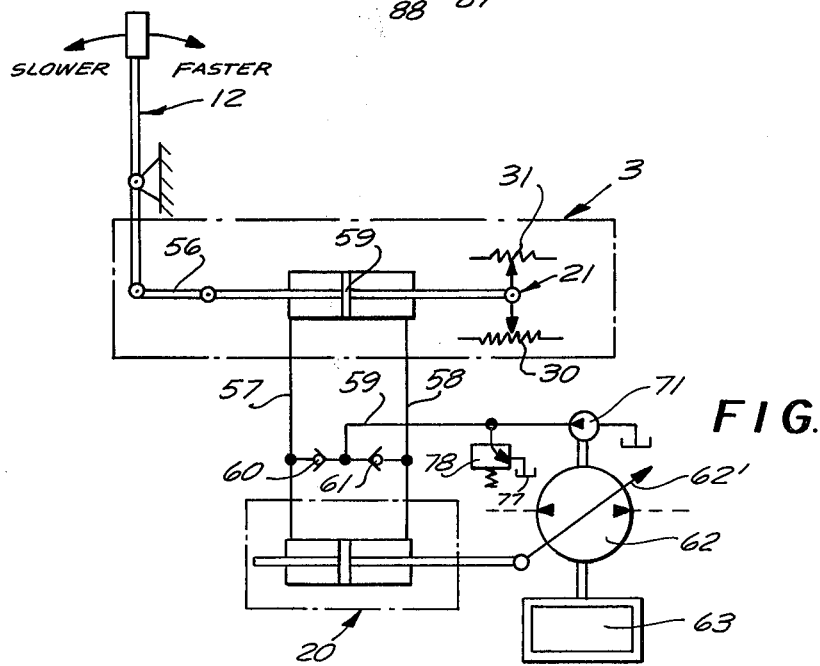

AUTOMATIC STEERING SYSTEM FOR STANDING-CROP HARVESTER

CROSS-REFERENCE TO RELATED APPLICATION

This application is related to copending and commonly assigned patent application Ser. No. 421,494 filed on Dec. 3, 1973 now U.S. Pat. No. 3,904,345 by Helmut Oni and Dieter Grabenhorst for a HEIGHT CONTROL FOR IMPLEMENT SUPPORT ON AN AGRICULTURAL MACHINE.

FIELD OF THE INVENTION

The present invention relates to a method of and an apparatus for automatically steering a crop harvester. More particularly this invention concerns such a steering system which automatically guides a harvester along the edge of the previously cut swath in a standing crop.

BACKGROUND OF THE INVENTION

A crop harvester is an extremely complicated and unwieldy piece of farm equipment. The operator of a typical standing-crop harvester must constantly survey various aspects of the harvesting operation, such as cutting height, obstacles in the path of the harvester, proper discharge of the cut crop to the wagon, and the like. It is absolutely essential that the harvesting machine be used with maximum efficiency, as the proper harvesting time must be observed and the elevated cost of the machinery requires its efficient use.

It has therefore been suggested as described in the above-copending application to provide automatic means for controlling the height of the harvesting implement on the front of the agricultural machine. It has also been suggested to provide automatic steering means which senses the edge of a cut swath and automatically guides the harvester along this edge so as to obtain a cut of maximum possible width without the driver's supervision. Thus the operator can merely guide the machine manually as he cuts his first swath and at each end of each swath; in between the machine automatically will guide itself and he can attend to other phases of the harvesting operation.

Relative to the normal direction of travel of the harvester the back wheels are usually the steered wheels, so as to permit the machine to turn in a minimum radius, literally making it possible for the machine to pivot on one of the front wheels. These rear wheels are usually operated by a double-acting hydraulic cylinder controlled from a power-steering arrangement at the driver's station. The automatic pilot is switched on by the driver and serves to operate this double-acting cylinder in accordance with an output produced by the crop sensor which is mounted on the front of the harvester. When the steering wheel is not in use the operator must throw the automatic steering control switch, and thereafter keep his hands free of the steering wheel which follows movements of the rear steered wheel. Since it is customary practice to provide such harvester steering wheels with a so-called spinner knob this continuously moving steering wheel presents a considerably hazard for the operator.

Another disadvantage with the known automatic steering systems is that the harvester is inadequately controlled when operating on a slope or inclination so that it tends to move in a downhill direction, the automatic steering controls frequently being inadequate to cope with this downhill bias. Furthermore, such a servosteering system frequently hunts excessively, as a result of the crop sensor only cancelling a steering instruction after an excessive steering compensation, so that the harvester is constantly hunting for a proper path.

Further disadvantages of such systems is that the steering composition which is necessary to correct the course at relatively low harvester speeds is excessive at high harvester speed so that the steering-control is only effective at a predetermined operation speed of the device. Such a limitation is disadvantageous in that it prevents the automatic steering control from being used when the vehicle is operating at a normally high or low speed.

An automatic steering system as described above must be manually switched on and manually switched off. This requires an extra motion by the driver in case a potentially dangerous situation arises, such as an obstacle suddenly appearing in the path of the harvester. He must first shut down the automatic steering control and then manually steer the harvester around the obstacle. The necessity of previously preforming these two functions creates a potentially harzardous situation in that the response time for taking over manual steering of the harvester is considerably increased.

OBJECTS OF THE INVENTION

It is therefore an object of the present invention to provide an improved steering system for a standing-crop harvester.

Another object is the provision of an improved method of and apparatus for automatically steering such a harvester which overcomes the above-given disadvantages.

SUMMARY OF THE INVENTION

These objects are obtained according to the present invention in a harvester provided with sensor means ahead of the chassis in the transport direction for detecting the edge of a swath cut in the standing crop and for generating an output corresponding to the position of this edge relative to the chassis. Actuation means independent of the steering element and connected to the sensor means receives this output and controls the guide wheels in accordance with the output. According to the present invention means is provided which is responsive to the inclination of the ground under the chassis for altering the output so as to basis the chassis directionally in the uphill direction. Also in accordance with the present invention means are provided responsive to the displacement speed of the chassis in the transport direction for altering this output so as to reduce the steering response with increasing speed and vice versa.

Further according to the present invention feedback means is responsive to the position of the steering wheels relative to the transport direction of the chassis for altering the output so as to eliminate this output when the guide wheels have made a response adequate to compensate for the alignment of the chassis with the swath, even though this compensation has not yet moved the chassis fully into the proper position along the edge of the swath.

Thus in accordance with the present invention the harvester automatically travels along the edge of a cut swath, following its edge closely. In case the ground under the swath is inclined the operator need merely sets a control so that the tendency of the harvester to move downhill is compensated in the automatic steering mechanism. Furthermore as the operator increases or decreases the speed of this harvester the automatic steering response is automatically altered in such a manner that with relative high speed compensation is small whereas with relatively slow speed the compensation is great, thereby ensuring proper following of the swath edge under all conditions. The feedback directly from the wheels prevents the machine from constantly swinging back and forth across the edge of the cut swath, as the output from the edge sensor is automatically cancelled out once a steering compensation has been made which is adequate to put the harvester back on its proper course, without having the machine swing back and forth across the swath edge hunting for the right position.

According to yet another feature of the invention means is provided at the steering wheel which is responsive to contact with the driver's hand for cutting out the automatic steering control the instant he grasps the steering wheel. Should he see an obstacle or the like he need merely take hold of the steering wheel and guide the harvester manually around it. Similarly at the end of the swath he need merely steer the harvester manually around and then release the steering wheel to automatically cut the automatic steering control back in. This automatic cut off is embodied as an electrocapacitative switch connected to the spinner knob on the spinning wheel so that presence of the hand alters the capacity and terminates the automatic steering control.

According to yet another feature of this invention the automatic steering control comprises a Wheatstone bridge circuit having four impedance legs. The impedance of one of the legs of one of the sides is affected by the crop sensor and the other leg of this same side has an impedance which is controlled according to the inclination of the harvester relative to the horizontal. The other leg of the other side is connected to the vehicle wheel for feedback, and the impedances of both of the other legs of both of the sides are controlled by the harvester speed control. One leg of the other side has its impedance also controllable by a crop-addition setting so that the output from the crop sensor, which controls the impedance of the one leg of the one side can be corrected according to type of crop. A zero-voltage detector connected between the middles of the two sides and is connected through the above-mentioned electrocapacitative switch to a electromechanical servovalve which operates the double-acting cylinder that steers the harvester. Thus the steering control is responsive to crop condition, position of the crop edge relative to the chassis, displacement speed of the harvester in the transport direction, and position of the guide wheels relative to the chassis. In this manner all of the information which has any effect on the automatic steering is employed so as to provide an automatic steering system which guides the harvester surely and efficiently along the edge of a swath, regardless of crop condition, vehicle speed, or inclination of the ground under the harvester. All of the various parameters are formed by steplessly varying impedance so as to give the system maximum sensitivity and flexibility.

In accordance with the present invention the sensor means is provided with a potentiometer and a flexible fiberglass rod which is spring biased toward the crop edge to be sensed. Thus the output of the potentiometer mounted at the pivot point of this rod is proportional to the deflection of this rod by the crop. Alternatively it is possible to provide an array of small light closets which detect the crop optically and produce outputs which are fed via a comparator circuit to the impedance bridge.

In accordance with yet another feature of this invention there is provided between the pump controlled by the steering wheel and the double-acting cylinder which is controlled both by this steering-wheel pump and by the electromechanical valve of the automatic steering apparatus a double check valve which normally prevents fluid flow back toward the steering-wheel pump so that the steering wheel remains at rest when the automatic steering control is in operation. In this manner the operator can rest his elbows on the steering wheel when the automatic pilot is in operation, and need merely grasp the spinner knob to cut out the automatic pilot and operate the harvester manually.

BRIEF DESCRIPTION OF THE DRAWING

The above and other objects, features and advantages of the invention will become more readily apparent from the following description, reference being made to the accompanying drawing in which:

FIG. 4 is a top view of a crop sensor according to the present invention;

FIG. 5 is a detailed sectional view of the structure indicated by arrow V of FIG. 4, FIG. 6 is a view similar to FIG. 4 illustrating another crop sensor in accordance to this invention;

FIG. 7 is a sectional view of the detail indicated at VII in FIG. 6;

FIG. 8 is a schematic view of the steering system according to this invention; and FIG. 9 is a schematic view illustrating the harvester speed control.

SPECIFIC DESCRIPTION

Figure 1:
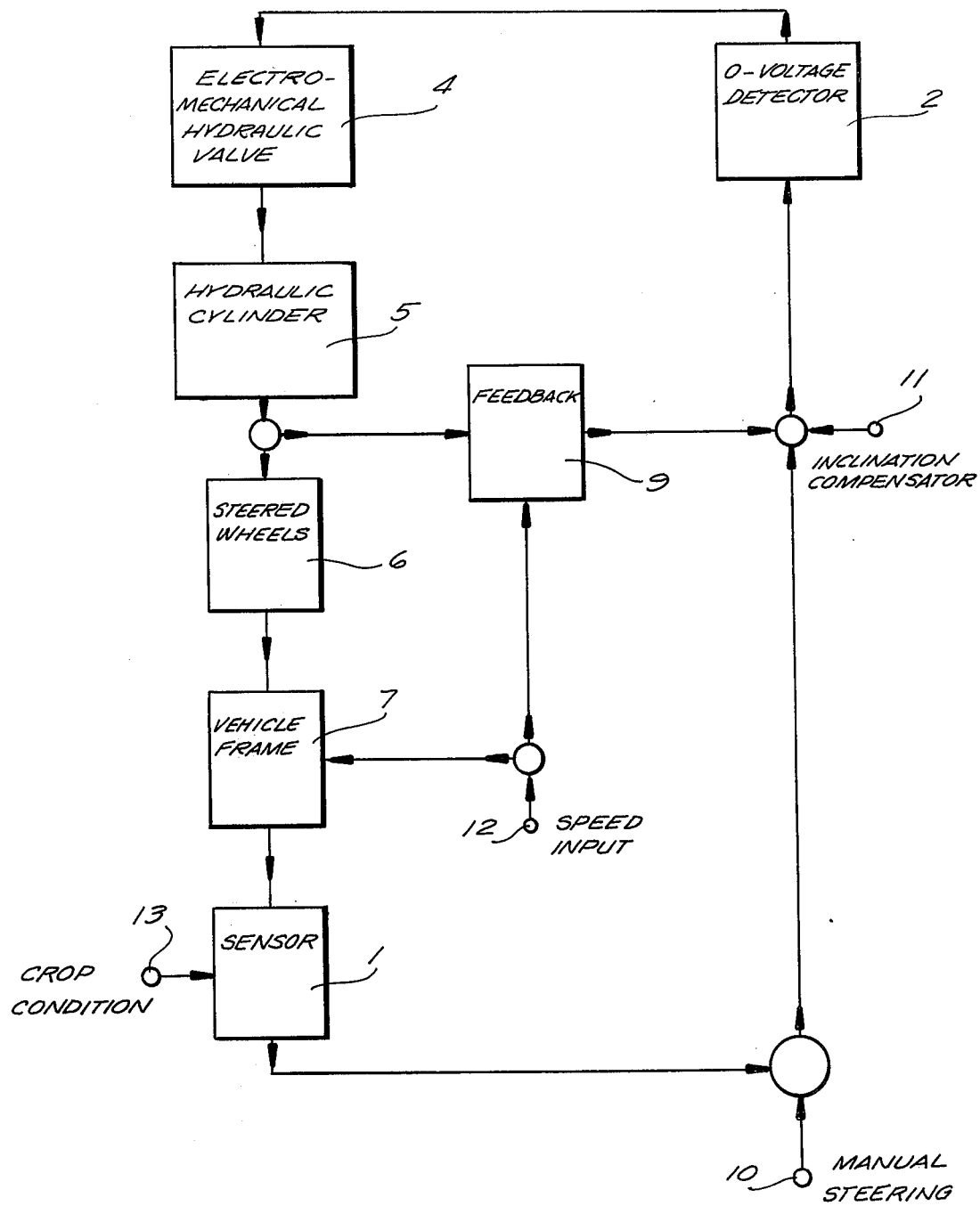
FIG. 1 is a block diagram illustrating the operation of the system according to the present invention.

As shown in FIG. 1 the servosystem according to the present invention basically comprises a crop sensor 1, a zero-voltage detector 2, an electromechanical hydraulic valve 4 connected to the zero-voltage detector and in turn connected to a hydraulic cylinder 5 which operates the steered wheels of the vehicle. Steered wheels 6 are carried on the vehicle frame 7. Feedback 9 from the wheels and an input 11 indicating the inclination of the frame 7 on the ground is fed to the zero-voltage detector. In addition a speed input 12 is combined with the feedback so as to affect the valve 4.

A manual steering system 10 can override this servosystem and a crop condition input 13 is compared with the output of the sensor so as further to control the zero-voltage detector 2.

Figure 2:
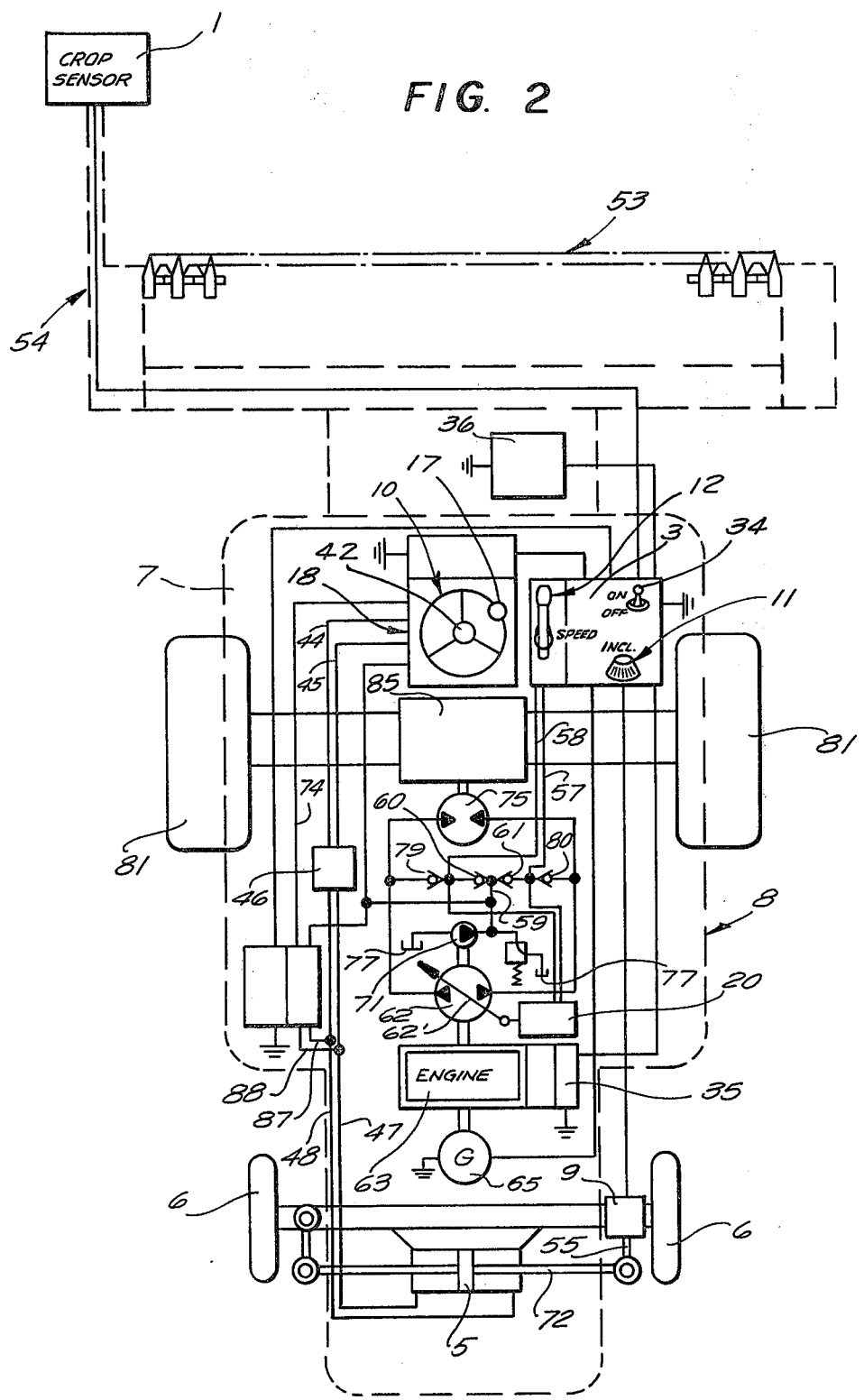
FIG. 2 is a top largely diagrammatic view of the harvester according to the present invention.

As shown in FIG. 2 the harvester frame 7 carries front wheels 81 which are driven through a transmission 85 by a large hydraulic motor 75. A diesel engine 63 is connected to a heavy-duty axial-piston hydraulic pump 62 connected to the motor 75. The swash plate 62' of the pump 62 can be displaced back and forth so as to vary the displacement speed of the chassis 7 along the ground while the speed of engine 63 remains constant.

FIG. 9 shows the speed control in more detail. An operating lever 12 on the control panel 3 is connected via a link 56 to a double-acting cylinder 59. Both sides of this cylinder are connected via hydraulic lines 57 and 58 to a slave cylinder 20 whose position is connected to the swash plate 62' of the pump 62. Thus the displacement of the lever 12 in either direction will correspondingly displace the swash plate 62' of the pump 62 which and thereby varies the displacement speed of the apparatus along the ground. Pressure is maintained in this speed-control system by a pump 71 connected with the pump 62 to the engine 63 and having an output line 59' connected to a pair of check valves 60 and 61 to the lines 57 and 58 respectively. A pressure regulator valve 78 is connected between the lines 59' and the hydraulic reservoir 77 of the system so as to maintain the pressure in line 59' uniform. In addition check valves 79 and 80 (FIG. 2) are provided between the lines 57 and 58 to compensate for leakage between the pump 62 and the motor 75.

Also as shown in FIG. 2 there is provided at the back of the chassis 7 the pair of steering wheels 6 each carried on a respective steering arm 55 connected via a respective piston rod 72 to the piston 5' of a double-acting hydraulic cylinder 5. FIG. 8 also shows how this cylinder 5 is connected via respective hydraulic lines 47 and 48 to a double-acting check valve 46 whose operation is described below FIG. 8). The primary chambers of this check valve 46 are connected via hydraulic lines 44 and 45 to a power-steering system 18 basically comprising a steering wheel 10 having a shaft 42 which operates a steering valve 73 and a positive displacement pump 76. During manual steering of the harvester the pump 71 is connected via a line 74 to the valve 73. Another hydraulic line 85 connects one side of the pump 76 to this valve 73.

Thus when the device is being steered manually straight ahead the valve 73 only connects the high-pressure input line 74 with the reservoir 77 and fluid flow between the lines 44 and 45 is blocked so that the piston 5' of the cylinder 5 is immovable and the wheels 6 are locked. Clockwise rotation of the wheel 10 connects the line 85 to the line 74 and the line 45 to the reservoir 77 so that operation of the positive-displacement pump 76 serves to pressurize the left-hand chamber of cylinder 5 and guide the vehicle to the right. Counterclockwise rotation of the wheel 10 will connect the high-pressure input line 74 to the line 45 and through the valve 46 to the line 47, thereby pressurizing the right-hand side of the cylinder 5. Simultaneously the line 85 to the pump 76 is connected to the reservoir 77 so that, as the steering wheel is rotated, a quantity of hydraulic fluid directly proportional to the angular displacement of the pump 66 is bled out of the left-hand chamber of the cylinder 5, thereby causing the wheels to turn the vehicle to the left.

As also shown in FIG. 8 the valve 4 of the automatic-steering system comprises a three-part slide valve 84 controlled by respective solenoids 82 and 83. So long as the vehicle is on proper course or is being manually steered neither of the solenoids 82, 83 is actuated and the pump 71 is connected only to the valve 73 of the power steering system 18. When, as will be described below, the automatic steering system is operating and requires a right-hand turn, the solenoid 83 pulls the valve 84 to the right and connects the pump 71 to a line 87 connected itself to the line 48 so as to pressurize the left-hand chamber of the cylinder 5. Simultaneously the right-hand chamber of the cylinder 5 is connected through lines 47 and a line 88 to the valve 4 and thence through the line 74 which is connected itself at this time by the valve 73 to the reservoir 77. Therefore the piston 5' moves to the right and the harvester is guided to the right. For a left-hand turn the solenoid 82 is actuated and the connections to line 88 and 87 are reversed.

FIG. 4 shows the crop sensor 1 according to the invention. This sensor 1 is mounted on an arm 54 extending forwardly to the left-hand side of the cutter assembly 53 on the front end of the harvester chassis 7. The spacing between the cutter 53 and the head 1 is 2–3 meters. A potentiometer 27 is provided with a feeler rod 49 of flexible light material such as fiberglass-reinforced synthetic resin and has another arm 50 which is biased by a pair of springs 51 and 52 so that the arm 49 extends at an angle $\alpha$ of approximately 75° to the transport direction T of the harvester under normal circumstances. When the arm 49 strikes a standing crop as shown at 13 in FIG. 5 this potentiometer is therefore operated so as to produce an impedance output which varies according to the extent of deflection of the arm 49. Deflection of approximately 30 degrees from the normal position as shown in FIG. 4 indicates that the head is moving at the proper angle along next to the edge of the crop 13. When the arm is swung out as shown in FIG. 5 the machine needs to be steered to the right into the uncut swath, and when the arm is deflected further towards the direction T the harvester must be steered to the left so as better to follow the crop edge.

FIG. 6 and FIG. 7 show a sensor 1' provided instead of with a potentiometer, with nine light-relection compartments having 18 sending diodes 37', 37", nine cover glasses 38', 9 infrared filters 39', nine photo transistors 40', and a comparator 41 which produces an impedance output that corresponds to the proximity of the crop 13. The sensor head 1' is arranged at an angle of substantially 45° to the direction of travel T and, therefore, to the crop edge.

As shown again in FIG. 8 the steering wheel shaft 42 is journaled in a housing 43 in which is provided a fixed coil 15 faced from another coil 14 carried on the shaft. The spinner knob 16 of the wheel 10 is connected to this coil 14 and constitutes an electrocapacitative sensor. High-frequency electric current generated from a detector 64 shown in FIG. 3 energizes the coil 15 and the coil 14 inductively so that when a hand grasps the spinner knob 16 the tuning characteristics change. This change is fed to a amplifier 33 which normally conducts electricity from lines 67 and 68 of a zero-voltage detector 2 to lines 69 and 70 that serve to operate the solenoids 82 and 83 (FIG. 8). When a hand grasps the spinner knob 16 current flow from lines 67 and 68 to lines 69 and 70 is interrupted, but when the hand is remote from this knob 16 the current flow from lines 67 and 68 is amplified and fed to lines 69 and 70.

Figure 3:
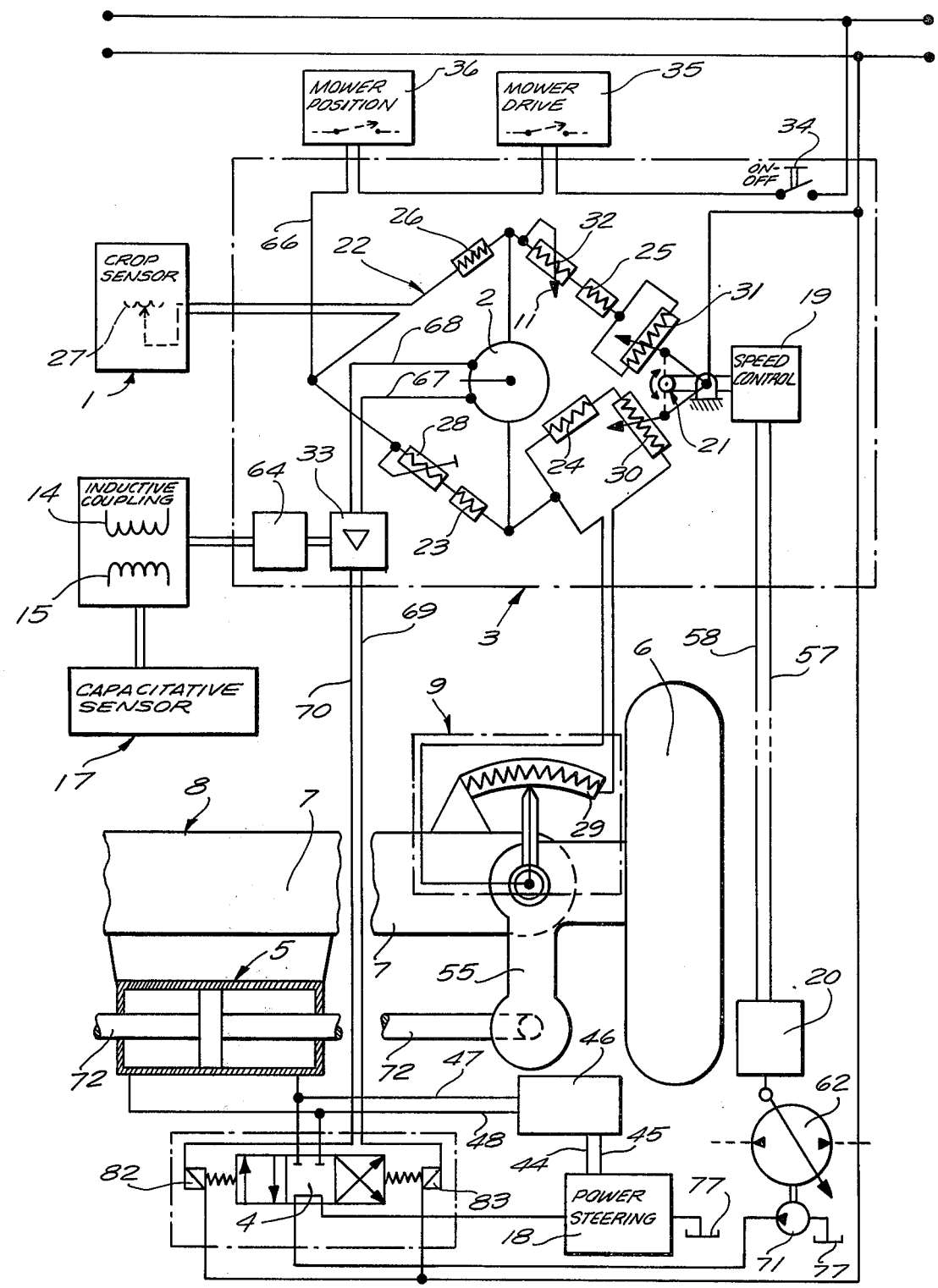
FIG. 3 is a largely schematic view of the automatic steering control in accordance with the present invention.

The control system shown in FIG. 3 is energized by a generator 65 (FIG. 2) which is connectable across a bridge circuit 22 in the control panel 3. This circuit 22 has one side with one leg formed by a fixed resistor 26 and the potentiometer 27 and another leg formed by a potentiometer 32, a fixed resistor 25, and another potentiometer 31. The other side of the bridge circuit has one leg formed by a potentiometer 28 and a fixed resistor 23 and in its other leg a fixed resistor 24 in parallel with a potentiometer 29 and both connected to the opposite ends of another potentiometer 30 in this other leg. The potentiometer 29 is carried on one of the steered wheels 6 of the harvester and has an impedance which increases as the vehicle is steered to the left and decreases as it is steered to the right. In series with the resistor 26 in the one leg of the one side of the bridge circuit is the potentiometer 27 of the crop sensor 1 and in the corresponding leg of the other side of the bridge circuit 22 there is provided the potentiometer 28 which is set according to the type of crop and how far from the edge of the mower 53 the sensor 1 is to be held. The potentiometer 32 is operated by the knob 11 according to the inclination on which the apparatus is being used. Alternatively it is within the scope of this invention to provide an automatic level sensor which automatically sets the potentiometer 32 according to ground inclination.

The potentiometers 30 and 31 have their wipers ganged and operated by a link 21 connected to the speed control 19. At a predetermined intermediate speed both the wipers of potentiometers 30 and 31 will lie in the center of their respective paths so that the resistance to both sides of these wipers in the potentiometers is equal. Both of the wipers of these potentiometers 30 and 31 are connected to one side of the input line. The other side of the input line is connected through the automatic-pilot ON-OFF switch 34, a motor drive switch 35 only closed when the mower is in operation, and a mower position switch 36 only closed when the mower is down and ready to function. Thus the bridge 22 is only energized when the mower is operating in the proper position and the switch 34 has been closed. In addition the zero-voltage detector 2 interconnecting the two sides of the bridge 22 is only connected through the amplifier 33 to the valve 4 when the operator's hand is away from the sensor 17 on the steering wheel 10.

The speed control 19 affects the potentiometers 30 and 31 so as to vary the steering response by increasing or decreasing the effect of a change in impedance in potentiometer 29 which gives the wheel-position feedback of the system. The inclination adjustment 11 in the same side of the bridge as the crop sensor 27 serves to bias the harvester directionally toward one side by unbalancing the bridge to an extent which is determined according to the inclination on which the harvester is operating.

The valve 46 shown in FIG. 8 in detail prevents the steering wheel 10 from turning when the automatic steering control is functioning. This valve 46 has a housing 46a with a pair of primary chambers 46a' and 46a'' respectively connected to the input lines 44 and 45. It also has a pair of secondary chambers 46b' and 46b'' connected to the outlet lines 48 and 47, respectively, and able to communicate with the respective chambers 46a' and 46a'' when a valve element 46c having a pair of heads 46c' and 46c'' is moved to the right against the force of a spring 46d. If either of the chambers 46a' or 46a'' is pressurized more than the respective chamber 46b' or 46b'', the valve body 46c moves to the right and allows fluid communication between the primary chambers 46a' and 46a'' and the respective secondary chamber 46b' and 46b''. This pressurization of the primary chambers only occurs, however, when the steering wheel is actuated either in one direction so as to pump liquid with pump 76 into the chamber 46a' or so as to open the valve 73 and connect the line 45 with the high-pressure line 74. Otherwise the valve 46 remains closed and prevents rotation of the steering wheel 10.

Thus the operator of the harvesting machine need merely cut the first swath in the field with the machine under manual control. Then he starts the machine at the edge of the swath, closes the switch 34, makes sure the mower is down in position and operating, and lifts his hand from the spinner knob 16. This automatically starts the automatic pilot so that the machine follows the edge of the swath itself. The operator can then vary the speed with lever 12 either faster or slower while in no way interfering with the normal steering response, and can otherwise attend to his duties on the machine without having to worry about steering. Should any obstacle be sighted or should he need to take over control of the machine, for instance, to turn it around at the end of the swath, he need merely grasp the knob 16 and execute the necessary steering operation. Once this operation is completed the operator sets the mower back more or less on course and releases knob 16 so that the machine will again follow the edge of the swath.

I claim:

1. An automatic steering system for a standing-crop harvester having a chassis adapted to travel in a transport direction along the ground and carrying guide wheels operated by a steering element on the chassis, said system comprising:

sensor means at a forward location of said chassis in said transport direction and mounted on said chassis for detecting the edge of a swath cut in a standing crop and generating an output corresponding to the position of said edge relative to said chassis;

actuation means independent of said steering element and connected to said sensor means for receiving said output and controlling said guide wheels in accordance with said output; and means for altering said output before reception thereof by said actuation means in accordance with the inclination of the ground under said chassis for biasing said chassis directionally in an uphill direction.

2. An automatic steering system for a standing crop harvester having a chassis displaced by a drive having a speed-control element along the ground in a transport direction and carrying guide wheels operable by a steering element on the chassis, said system comprising:

sensor means ahead of said chassis in said transport direction and mounted on said chassis for detecting the edge of a swath cut in a standing crop and generating an output corresponding to the position of said edge relative to said chassis;

actuation means independent of said steering element and connected to said sensor means for receiving said output and controlling said guide wheels in accordance therewith; and means connected to said speed-control element and to said sensor means for altering said output in accordance with displacement speed of said chassis along the ground for reducing the steering response of said guide wheels in response to said output with increased displacement speed.

3. An automatic steering system for a standing crop harvester having a chassis displaceable along the ground in a transport direction and carrying guide wheels operable by a steering element on said chassis, said system comprising:

sensor means ahead of said chassis in said transport direction and mounted on said chassis for detecting the edge of a swath cut in a standing crop and generating an output corresponding to the position of said edge relative to said chassis;

actuation means independent of said steering element and connected to said sensor means for receiving said output and controlling said guide wheels in accordance therewith; and means responsive to the position of said guide wheels relative to said chassis and to said transport direction for altering said output so as to control displacement of said guide wheels by feedback once said guide wheels are set thereby in an orientation to bring said chassis into a predetermined position relative to said edge.

4. The system defined in claim 3 wherein said means responsive to said guide wheels includes a variable impedance having a portion connected to a one of said guide wheels and displaceable thereby so as to have an impedance dependent on wheel position.

5. A steering system for a harvesting-machine chassis displaceable along the ground in a transport direction and having at least one guide wheel operable by a steering element, said system comprising:

a crop-swath sensor on said chassis;

automatic steering means connected to said guide wheel and connected to said sensor for steering said chassis along the ground according to a predetermined path corresponding to a swath independent of displacement of said steering element;

means for operatively coupling said steering element to said guide wheel to terminate operation of said automatic steering means; and pump means connected to said steering element and cylinder means connected to said pump means and to said guide wheel for hydraulic actuation of said cylinder means by said pump means on actuation of said steering element, said means for coupling including at least one check valve between said pump means and said cylinder means, said automatic steering means being connected to said cylinder means and means for controlling said check valve to prevent displacement of said steering element by movement of said guide wheel.

6. The system defined in claim 5 wherein said check valve includes a double check valve only allowing fluid flow between said pump means and said cylinder means on actuation of said steering element.

7. An automatic steering system for a chassis displaceable along the ground and having at least one guide wheel directable by a steering element, said system comprising:

automatic steering means connectable to said guide wheel for steering said chassis along the ground according to a predetermined path independent of displacement of said steering element, said steering element comprising a steering wheel and a spinner knob on said wheel; and a capacitive switch on said knob responsive to the grasping of said knob by the driver of said chassis for uncoupling said automatic steering means from said guide wheel.

8. A method of guiding a standing-crop harvester comprising the steps of:

sensing the edge of a swath in said standing crop and generating an impedance output;

detecting the speed of displacement of said harvester along the ground and generating an impedance output corresponding to said speed;

generating an impedance output having a magnitude corresponding to the side-to-side inclination of the ground under said harvester; and combining said impedance outputs and controlling the orientation of guide wheels of said harvester in accordance with the combined outputs.

9. The method defined in claim 8 wherein said outputs are signals derived from respective resistors.

* * * * *